(12) United States Patent
Grant et al.

(10) Patent No.: US 8,573,476 B2
(45) Date of Patent: Nov. 5, 2013

(54) MOBILE TABLE FOR IMPLEMENTING CLAMSHELL-TO-CASE ASSOCIATION

(75) Inventors: Elliott Grant, Redwood City, CA (US); J. Scott Carr, Redwood City, CA (US); Albert Anthony Luna, Redwood City, CA (US); Sean Calhoon, Lake Oswego, OR (US)

(73) Assignee: YottaMark, Inc., Redwood City, CA (US)

( * ) Notice: Subject to any disclaimer, the term of this patent is extended or adjusted under 35 U.S.C. 154(b) by 0 days.

(21) Appl. No.: 13/593,851

(22) Filed: Aug. 24, 2012

(65) Prior Publication Data

US 2012/0318861 A1 Dec. 20, 2012

Related U.S. Application Data

(62) Division of application No. 13/431,983, filed on Mar. 28, 2012, now Pat. No. 8,261,973, which is a division of application No. 12/501,240, filed on Jul. 10, 2009, now Pat. No. 8,240,564.

(60) Provisional application No. 61/080,121, filed on Jul. 11, 2008.

(51) Int. Cl.
*G06F 17/00* (2006.01)
*G06K 7/00* (2006.01)

(52) U.S. Cl.
USPC ............................................ 235/375; 235/440

(58) Field of Classification Search
USPC .................................. 235/375, 440, 454, 385
See application file for complete search history.

(56) References Cited

U.S. PATENT DOCUMENTS

| 4,385,482 A | 5/1983 | Booth |
| 4,526,404 A | 7/1985 | Vazquez |
| 4,544,590 A | 10/1985 | Egan |

(Continued)

FOREIGN PATENT DOCUMENTS

| CN | 1350265 A | 5/2002 |
| JP | 2000011114 A2 | 1/2000 |

(Continued)

OTHER PUBLICATIONS

PCT/US08/75626 International Search Report and Written Opinion, Nov. 26, 2008.

(Continued)

*Primary Examiner* — Michael G Lee
*Assistant Examiner* — Suezu Ellis
(74) *Attorney, Agent, or Firm* — Peters Verny, LLP

(57) ABSTRACT

Systems and methods are provided for associating traceability codes on clamshells with unique identifiers on containers in which the empty clamshells are packed for later use. In various methods, the clamshells are marked with traceability codes and stacked together, one traceability code is read from one of the clamshells in each stack, a unique identifier is read from a container, and the stack is placed in the container. The traceability code is stored in association with the unique identifier for later retrieval. An exemplary table for making clamshell-to-container associations comprises a scanner for reading traceability codes and rails for positioning stacks of clamshells proximate to the scanner. The table can also comprise a second scanner positioned to read unique identifiers from containers placed proximate thereto. The table can further comprise a computing system to make and store the associations.

6 Claims, 6 Drawing Sheets

(56) References Cited

U.S. PATENT DOCUMENTS

| | | |
|---|---|---|
| 4,832,204 A | 5/1989 | Handy et al. |
| 4,846,504 A | 7/1989 | MacGregor et al. |
| 5,136,826 A | 8/1992 | Carson et al. |
| 5,271,642 A | 12/1993 | Jahier et al. |
| 5,343,529 A | 8/1994 | Goldfine et al. |
| 5,360,628 A | 11/1994 | Butland |
| 5,361,904 A | 11/1994 | Kapec et al. |
| 5,362,949 A | 11/1994 | Gulick |
| 5,478,990 A | 12/1995 | Montanari et al. |
| 5,486,686 A | 1/1996 | Zydbel, Jr. et al. |
| 5,561,970 A | 10/1996 | Edie et al. |
| 5,569,317 A | 10/1996 | Sarada et al. |
| 5,592,561 A | 1/1997 | Moore |
| 5,611,948 A | 3/1997 | Hawkins |
| 5,619,416 A | 4/1997 | Kosarew |
| 5,668,803 A | 9/1997 | Tymes et al. |
| 5,695,071 A | 12/1997 | Ross et al. |
| 5,768,384 A | 6/1998 | Berson |
| 5,793,030 A | 8/1998 | Kelly, Jr. |
| 5,895,073 A | 4/1999 | Moore |
| 5,917,925 A | 6/1999 | Moore |
| 6,005,960 A | 12/1999 | Moore |
| 6,041,929 A | 3/2000 | Brunner et al. |
| 6,069,955 A | 5/2000 | Coppersmith et al. |
| 6,111,953 A | 8/2000 | Walker et al. |
| 6,203,069 B1 | 3/2001 | Outwater et al. |
| 6,211,789 B1 | 4/2001 | Oldham et al. |
| 6,212,638 B1 | 4/2001 | Lee et al. |
| 6,226,619 B1 | 5/2001 | Halperin et al. |
| 6,231,435 B1 | 5/2001 | Pilger |
| 6,246,778 B1 | 6/2001 | Moore |
| 6,269,342 B1 | 7/2001 | Brick et al. |
| 6,297,508 B1 | 10/2001 | Barmore et al. |
| 6,308,165 B1 | 10/2001 | Gilham |
| 6,314,337 B1 | 11/2001 | Marcum |
| 6,329,920 B1 | 12/2001 | Morrison et al. |
| 6,342,839 B1 | 1/2002 | Curkendall et al. |
| 6,346,885 B1 | 2/2002 | Curkendall |
| 6,349,292 B1 | 2/2002 | Southerland et al. |
| 6,361,079 B1 | 3/2002 | Kirkman |
| 6,363,483 B1 | 3/2002 | Keshav |
| 6,364,990 B1 | 4/2002 | Grosskopf et al. |
| 6,398,106 B1 | 6/2002 | Ulvr et al. |
| 6,409,082 B1 | 6/2002 | Davis et al. |
| 6,428,640 B1 | 8/2002 | Stevens et al. |
| 6,442,276 B1 | 8/2002 | Doljack |
| 6,456,729 B1 | 9/2002 | Moore |
| 6,473,739 B1 | 10/2002 | Showghi et al. |
| 6,536,672 B1 | 3/2003 | Outwater |
| 6,547,137 B1 | 4/2003 | Begelfer et al. |
| 6,591,252 B1 | 7/2003 | Young |
| 6,612,494 B1 | 9/2003 | Outwater |
| 6,664,897 B2 | 12/2003 | Pape et al. |
| 6,680,783 B1 | 1/2004 | Pierce et al. |
| 6,766,324 B2 | 7/2004 | Carlson et al. |
| 6,788,800 B1 | 9/2004 | Carr et al. |
| 6,796,504 B2 | 9/2004 | Robinson |
| 6,805,926 B2 | 10/2004 | Cote et al. |
| 6,806,478 B1 | 10/2004 | Hatfield |
| 6,808,574 B1 | 10/2004 | Stevens et al. |
| 6,859,672 B2 | 2/2005 | Roberts et al. |
| 6,991,261 B2 | 1/2006 | Dronzek, Jr. et al. |
| 6,995,675 B2 | 2/2006 | Curkendall et al. |
| 6,996,543 B1 | 2/2006 | Coppersmith et al. |
| 7,009,723 B1 | 3/2006 | Bartholet et al. |
| 7,013,286 B1 | 3/2006 | Aggarwal et al. |
| 7,040,532 B1 | 5/2006 | Taylor et al. |
| 7,043,442 B2 | 5/2006 | Levy et al. |
| 7,137,000 B2 | 11/2006 | Hohberger et al. |
| 7,152,040 B1 | 12/2006 | Hawthorne et al. |
| 7,207,481 B2 | 4/2007 | Barenburg et al. |
| 7,211,163 B2 | 5/2007 | Kennedy |
| 7,222,791 B2 | 5/2007 | Heilper et al. |
| 7,261,235 B2 | 8/2007 | Barenburg et al. |
| 7,277,601 B2 | 10/2007 | Zorab et al. |
| 7,283,630 B1 | 10/2007 | Doljack |
| 7,295,114 B1 | 11/2007 | Drzaic et al. |
| 7,321,310 B2 | 1/2008 | Curkendall et al. |
| 7,412,461 B2 | 8/2008 | Sholl et al. |
| 7,519,825 B2 | 4/2009 | Geoffrey |
| 7,614,546 B2 | 11/2009 | Grant et al. |
| 7,657,931 B2 | 2/2010 | Margolus et al. |
| 7,686,513 B2 | 3/2010 | Knoerzer et al. |
| 7,705,735 B2 | 4/2010 | Pape et al. |
| 7,714,729 B2 | 5/2010 | Pape et al. |
| 7,766,240 B1 | 8/2010 | Grant |
| 7,770,783 B2 | 8/2010 | Grant et al. |
| 7,810,726 B2 | 10/2010 | de la Huerga |
| 7,823,768 B2 | 11/2010 | Self et al. |
| 7,827,058 B2 | 11/2010 | Mortimer |
| 7,909,239 B2 | 3/2011 | Grant et al. |
| 7,992,772 B2 | 8/2011 | Grant et al. |
| 8,019,662 B2 | 9/2011 | Lucas |
| 8,108,309 B2 | 1/2012 | Tan |
| 8,140,852 B2 | 3/2012 | Guenter et al. |
| 8,152,063 B1 | 4/2012 | Grant et al. |
| 8,155,313 B2 | 4/2012 | Grant |
| 8,196,827 B1 | 6/2012 | Grant |
| 8,210,430 B1 | 7/2012 | Grant et al. |
| 8,284,988 B2 * | 10/2012 | Sones et al. ............... 382/101 |
| 8,342,393 B2 | 1/2013 | Grant et al. |
| 8,428,773 B1 | 4/2013 | Carr et al. |
| 8,496,173 B2 * | 7/2013 | Anselment et al. ......... 235/440 |
| 2001/0054005 A1 | 12/2001 | Hook et al. |
| 2001/0056359 A1 | 12/2001 | Abreu |
| 2002/0004767 A1 | 1/2002 | Okamoto et al. |
| 2002/0062241 A1 | 5/2002 | Rubio et al. |
| 2002/0072984 A1 | 6/2002 | Rothman et al. |
| 2002/0131442 A1 | 9/2002 | Garg et al. |
| 2002/0158765 A1 | 10/2002 | Pape et al. |
| 2002/0178363 A1 | 11/2002 | Ambrogio et al. |
| 2003/0019186 A1 | 1/2003 | Hakansson |
| 2003/0080191 A1 | 5/2003 | Lubow et al. |
| 2003/0083958 A1 | 5/2003 | Song et al. |
| 2003/0089078 A1 | 5/2003 | Christina |
| 2003/0105680 A1 | 6/2003 | Song et al. |
| 2003/0177025 A1 | 9/2003 | Curkendall et al. |
| 2003/0177095 A1 | 9/2003 | Zorab et al. |
| 2003/0185948 A1 | 10/2003 | Garwood |
| 2003/0221108 A1 | 11/2003 | Rupp |
| 2004/0065053 A1 | 4/2004 | Rice et al. |
| 2004/0159527 A1 | 8/2004 | Williamson |
| 2004/0167829 A1 | 8/2004 | Fujita |
| 2004/0200892 A1 | 10/2004 | Curkendall et al. |
| 2004/0205343 A1 | 10/2004 | Forth et al. |
| 2004/0230796 A1 | 11/2004 | Lundvall et al. |
| 2005/0004682 A1 | 1/2005 | Gaddis et al. |
| 2005/0038756 A1 | 2/2005 | Nagel |
| 2005/0075900 A1 | 4/2005 | Arguimbau, III |
| 2005/0097054 A1 | 5/2005 | Dillon |
| 2005/0108044 A1 | 5/2005 | Koster |
| 2005/0182695 A1 | 8/2005 | Lubow et al. |
| 2005/0206586 A1 | 9/2005 | Capurso et al. |
| 2005/0216304 A1 | 9/2005 | Westphal |
| 2005/0247778 A1 | 11/2005 | Roberts |
| 2005/0251449 A1 | 11/2005 | Pape et al. |
| 2005/0288947 A1 | 12/2005 | Mallonee et al. |
| 2006/0004907 A1 | 1/2006 | Pape et al. |
| 2006/0022059 A1 | 2/2006 | Juds |
| 2006/0054682 A1 | 3/2006 | de la Huerga et al. |
| 2006/0071085 A1 | 4/2006 | Philyaw et al. |
| 2006/0100964 A1 | 5/2006 | Wilde et al. |
| 2006/0111845 A1 | 5/2006 | Forbis et al. |
| 2006/0161443 A1 | 7/2006 | Rollins |
| 2006/0180661 A1 | 8/2006 | Grant et al. |
| 2006/0187048 A1 | 8/2006 | Curkendall et al. |
| 2006/0259182 A1 | 11/2006 | Mantell |
| 2006/0260495 A1 | 11/2006 | Siedlaczek |
| 2006/0266827 A1 | 11/2006 | Hamilton |
| 2006/0271390 A1 | 11/2006 | Rich et al. |
| 2006/0289654 A1 | 12/2006 | Robinson et al. |
| 2007/0001006 A1 | 1/2007 | Schuessler et al. |
| 2007/0051362 A1 | 3/2007 | Sullivan et al. |
| 2007/0119954 A1 | 5/2007 | Barenburg et al. |

(56) References Cited

U.S. PATENT DOCUMENTS

| | | |
|---|---|---|
| 2007/0119955 A1 | 5/2007 | Barenburg et al. |
| 2007/0162412 A1 | 7/2007 | Percy |
| 2007/0170240 A1 | 7/2007 | Grant et al. |
| 2007/0175974 A1 | 8/2007 | Self et al. |
| 2007/0203724 A1 | 8/2007 | Farmer et al. |
| 2007/0203818 A1 | 8/2007 | Farmer et al. |
| 2007/0205258 A1 | 9/2007 | Self et al. |
| 2007/0219916 A1 | 9/2007 | Lucas |
| 2008/0011841 A1 | 1/2008 | Self et al. |
| 2008/0011843 A1 | 1/2008 | Barenburg et al. |
| 2008/0023472 A1 | 1/2008 | Brandt |
| 2008/0030348 A1 | 2/2008 | Pape et al. |
| 2008/0046263 A1 | 2/2008 | Sager et al. |
| 2008/0059335 A1 | 3/2008 | Tenorio et al. |
| 2008/0143094 A1 | 6/2008 | Goetz |
| 2008/0178197 A1 | 7/2008 | Pape et al. |
| 2008/0215484 A1 | 9/2008 | Oldham et al. |
| 2008/0222042 A1 | 9/2008 | Moore et al. |
| 2009/0065568 A1* | 3/2009 | Grant et al. ............ 235/375 |
| 2009/0065579 A1 | 3/2009 | Grant et al. |
| 2009/0242631 A1 | 10/2009 | Wishnatzki et al. |
| 2009/0270174 A1 | 10/2009 | Kelly et al. |
| 2009/0270175 A1 | 10/2009 | Kelly et al. |
| 2010/0106660 A1 | 4/2010 | Farmer et al. |
| 2010/0145730 A1 | 6/2010 | Abreu |
| 2011/0087839 A1 | 4/2011 | Sharma et al. |
| 2011/0098026 A1* | 4/2011 | Uland ................... 455/414.2 |
| 2012/0037697 A1 | 2/2012 | Boone et al. |
| 2012/0278767 A1 | 11/2012 | Stibel et al. |
| 2012/0298741 A1 | 11/2012 | Grant et al. |
| 2013/0077778 A1 | 3/2013 | Grant |

FOREIGN PATENT DOCUMENTS

| | | |
|---|---|---|
| JP | 2002140449 A2 | 5/2002 |
| WO | 03007252 A1 | 1/2003 |
| WO | 03060752 A1 | 7/2003 |
| WO | 2004075098 A1 | 9/2004 |
| WO | 2006084090 A2 | 8/2006 |
| WO | 2007140018 A2 | 6/2007 |

OTHER PUBLICATIONS

Secure Symbology, Inc. Business Overview, May 2008.
Paul Chang, IBM Industry Forum 2010, Mexico Industry Event, 2010.
U.S. Appl. No. 12/206,156 Office action, mailed Nov. 15, 2010.
U.S. Appl. No. 12/206,156 Applicants' Amendment A, filed Jan. 10, 2011.
PCT/US06/03768 International Search Report and Written Opinion, Jun. 12, 2008.
"CRC: Implementation," http://www.relisoft.com/science/CrcNaive.html, 2006.
Yoichi Shibata et al., "Mechanism-based PKI," Computer System Symposium 2003, vol. 2003 (15), pp. 181-186, (1998).
Roberti, M., "RFID Will Help Keep Perishables Fresh" (Aug. 3, 2005), RFID Journal, www.rfidjournal.com/article/view/1775.
Ilic, A. et al., "The Value of Sensor Information for the Management of Perishable Goods—A Simulation Study" (Jun. 4, 2008), http://www.im.ethz.ch/publications/ilic_voi_perishables_perceived_quality_0608.pdf.
MX 2009/007496 Applicant's response to Office Action, filed Sep. 6, 2012.
TW 098123663 Office Action, mailed Apr. 8, 2013.

* cited by examiner

MOBILE TABLE FOR IMPLEMENTING CLAMSHELL-TO-CASE ASSOCIATION

CROSS-REFERENCE TO RELATED APPLICATIONS

This application is a divisional application of U.S. patent application Ser. No. 13/431,983 filed on Mar. 28, 2012, now U.S. Pat. No. 8,261,973, which is a divisional application of U.S. patent application Ser. No. 12/501,240 filed on Jul. 10, 2009, now U.S. Pat. No. 8,240,564, which claims the benefit of U.S. Provisional Patent Application No. 61/080,121 filed on Jul. 11, 2008, all entitled "Mobile Table for Implementing Clamshell-to-Case Association" and all incorporated herein by reference. This application is related to, and incorporates by reference U.S. Provisional Patent Applications No. 60/970,933 filed on Sep. 7, 2007 and titled "Attributing Harvest Information with Unique Identifiers" and No. 61/028,163 filed on Feb. 2, 2008 and titled "Systems and Methods of Associating Individual Packages with Harvest Crates" and U.S. patent application Ser. No. 12/206,156 filed on Sep. 8, 2008 and entitled "Attributing Harvest Information with Unique Identifiers," now U.S. Pat. No. 7,909,239, and U.S. patent application Ser. No. 12/370,346 filed on Feb. 12, 2009 and entitled "Systems and Methods of Associating Individual Packages with Harvest Crates," now U.S. Pat. No. 8,428,773.

BACKGROUND OF THE INVENTION

Produce is often packaged in clamshell units. Such clamshells provide retailers and restaurant operators with a standardized merchandizing unit, offer brand owners a labeling opportunity, and offer convenience to the consumer. Clamshells are typically manufactured using a thermal forming process. Following their manufacture, clamshells are typically nested together to save space and stored in bulk containers.

Adding traceability to item-level produce requires putting a unique code on each package, such as each clamshell. In some prior art implementations, codes have been added with an inkjet system. Problems with the use of inkjet systems to mark codes onto clamshells and other packages include (a) inkjet systems require considerable maintenance, (b) codes tend to be poorly printed and therefore difficult to read, and (c) typical inkjet systems cannot reliably print small barcodes, and barcodes are needed for automated scanning such as along the distribution chain, in stores, or anywhere one has a mobile phone configured with a barcode reader.

SUMMARY

An exemplary method comprises reading a traceability code from a clamshell of a stack of a plurality of clamshells, reading a unique identifier disposed on a container, storing the traceability code read from the clamshell of the stack in association with the unique identifier, and placing the stack in the container. In some embodiments, the method further comprises reading the traceability code from the clamshell with a first scanner disposed on a table, and in some of these embodiments the method further comprises reading the unique identifier from the container with a second scanner disposed on the table.

In some embodiments, before reading the traceability code, the method further comprises printing a traceability code on each of a plurality of labels. In some of these embodiments, the method further comprises marking each of the plurality of clamshells with a traceability code by affixing a label of the plurality of labels to each of the clamshells. In other embodiments, the method further comprises, before reading the traceability code, marking each of the plurality of clamshells with a traceability code such as by printing directly onto the clamshells. In further embodiments, such as some of the embodiments that comprise marking each of the plurality of clamshells with the traceability code, the method further comprises nesting the plurality of marked clamshells together to form the stack. In some of these embodiments, the method further comprises reading a traceability code from each of the plurality of clamshells before nesting the plurality of clamshells. The method, in some embodiments, further comprises fabricating the plurality of clamshells, labeling the plurality of clamshells each with a unique traceability code, reading the unique traceability code from each of the plurality of clamshells, and then nesting the plurality of clamshells.

Another exemplary method comprises marking each of a plurality of clamshells with a traceability code and nesting the plurality of marked clamshells together to form a stack. The method further comprises storing an association between the traceability code read from a clamshell of the stack and a unique identifier of a container and placing the stack in the container. Some embodiments further comprise reading the unique identifier from the container and determining a traceability code from the unique identifier, for example, by referencing the unique identifier in a database.

In various embodiments storing the association between the traceability code read from the clamshell of the stack and the unique identifier of the container includes uploading the traceability code and the unique identifier to a host computing system. In some of these embodiments the method further comprises reading a traceability code from each of the plurality of marked clamshells before nesting the plurality of marked clamshells. The method can further comprise uploading to the host computing system the traceability codes read from each of the plurality of marked clamshells and associating the traceability codes read from each of the plurality of marked clamshells with the unique identifier. Still further embodiments of the method further comprise uploading to the host computing system harvest event data and associating the harvest event data with the unique identifier of the container.

An exemplary table comprises a top surface, a lateral rail disposed on the top surface proximate and extending generally parallel to a front side of the top surface, and a transverse rail disposed on the top surface generally perpendicular to the lateral rail. The table also comprises a first scanner configured to read a traceability code on a clamshell held against a first side of the transverse rail and a second scanner configured to read a unique identifier disposed on a container disposed proximate to the top surface. In some embodiments, the table is configured to be mobile. The first scanner is disposed proximate to a second side of the transverse rail, in some embodiments, where the second side opposes the first side. In various embodiments, an orientation of the first scanner and/or an orientation of the second scanner is adjustable. The table can further including a calibration marking disposed on the lateral rail. The table can also further comprise a computing system having processing means including logic configured to associate a unique identifier read by the second scanner with one or more traceability codes read by the first scanner, as well as logic configured to store the association.

An exemplary system for associating clamshells with containers comprises means for consistently positioning a stack of clamshells, each clamshell including a traceability code and means for reading the traceability code from one clamshell of the stack when the stack is positioned by the means for consistently positioning the stack. The system also comprises means for reading a unique identifier from a container, and means for storing an associate between a unique identifier read by the means for reading the unique identifier and the traceability code read by the means for reading the traceability code.

Still another exemplary system for associating clamshells with containers comprises a table, including first and second scanners, and a third scanner in communication with the table. The table also includes a transverse rail disposed on a top surface thereof. The first scanner is configured to read a traceability code on a clamshell of a stack of clamshells when held against the transverse rail, and the second scanner is configured to read a unique identifier disposed on a container disposed proximate to the top surface. In various embodiments the system further comprises a labeler configured to affix labels to clamshells, and wherein the third scanner is configured to read traceability codes from the labels affixed to the clamshells by the labeler. The system can also comprise either or both of a clamshell fabricator and a host computing system. In those embodiments that comprise the host computing system, the table can further include logic configured to upload traceability codes and unique identifiers to the host computing system. In some of these embodiments the host computing system includes association logic configured to associate traceability codes with unique identifiers and configured to store the associations.

DETAILED DESCRIPTION OF THE INVENTION

The present disclosure is directed to systems and methods for associating traceability codes on unit-level packages, such as on clamshells, with unique identifiers of the containers in which the unit-level packages are stored prior to being deployed to be filled at a harvest event. By making this association, an entire container of unit-level packages, each bearing a unique traceability code, can be later associated with the harvest event data for that harvest event, for example, by reading the unique identifier of the container when deployed at the harvest event and then associating that unique identifier with the harvest event data. It will be understood that although embodiments of the invention are described with reference to clamshells for produce, the invention is equally applicable to other unit-level packaging that when empty can be nested to form stacks, such as cups.

Some embodiments of the present invention are directed to a table that facilitates making the clamshell-to-container associations at the time that the containers are filled with clamshells. In some instances, the table is mobile so that the table can be readily moved between clamshell production areas. The table includes two scanners, one configured to read traceability codes from clamshells, and another configured to read unique identifiers on containers placed proximate to the table.

Further embodiments of the present invention are directed to systems that include the table and at least a third scanner, external to the table, and in communication with the table. The system optionally comprises one or more components of a clamshell production line including one or more clamshell fabricators, labelers, and nesting equipment. The third scanner is situated relative to the line in order to read each traceability code on each labeled clamshell prior to the clamshells being nested together into stacks. Exemplary systems can further comprise a host computing system that can upload data from the table and store associations between the traceability codes read by the first and third scanners, and unique identifications read by the second scanner. In some embodiments, the host computing system also provides the traceability codes to the labeler. Still further embodiments of the present invention are directed to methods for using tables described herein to prepare containers of pre-labeled and nested clamshells to be deployed to harvest events, and methods for associating harvest event data with the clamshells supplied in a container.

Figure 1:
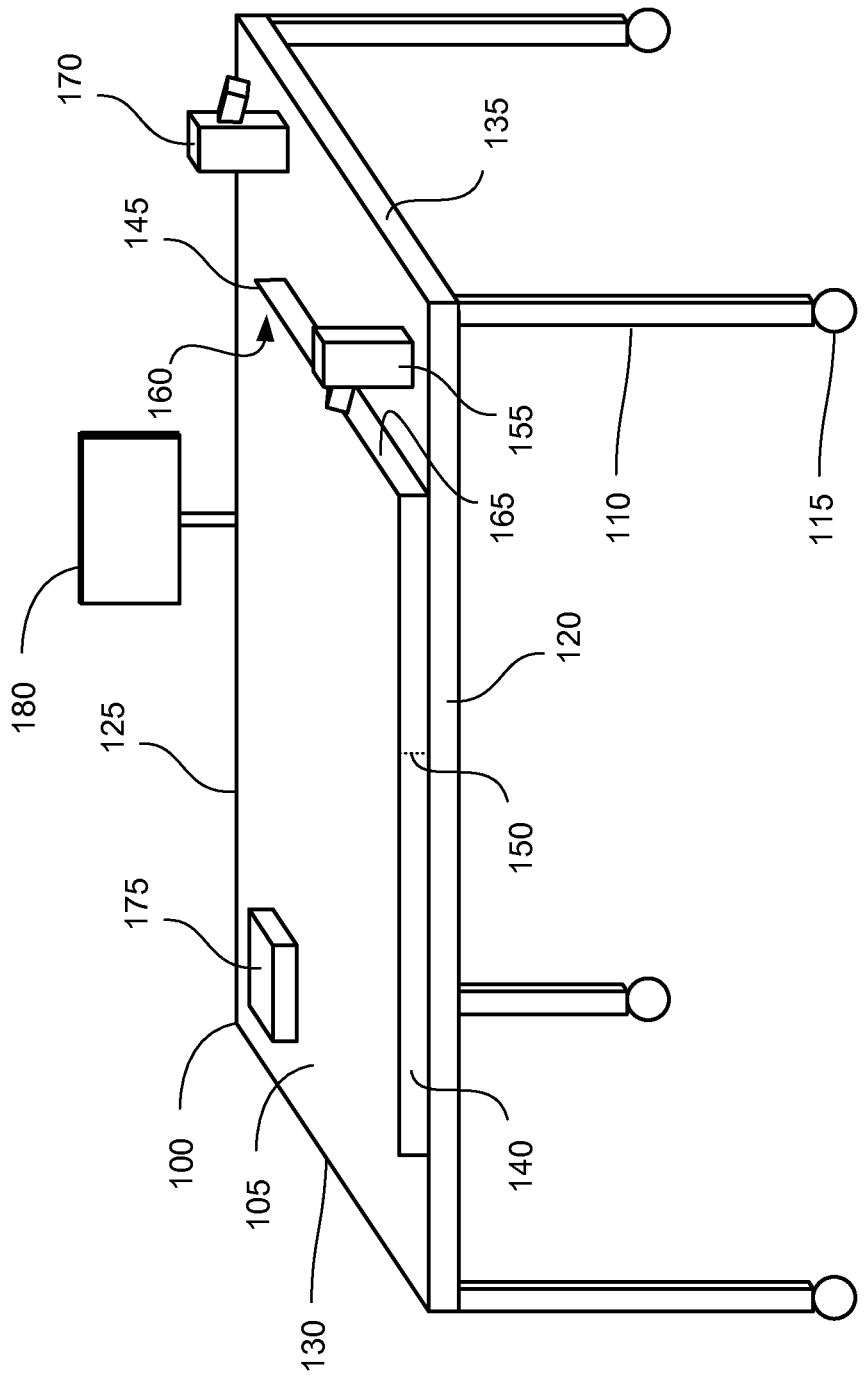
FIG. 1 shows a perspective view of a table according to an exemplary embodiment of the invention.

FIG. 1 shows a perspective view of a table 100 comprising a top surface 105 and means for supporting the top surface 105 such as the four legs 110 illustrated in the drawing. In some embodiments, the table 100 is configured to be mobile, for example with wheels 115 on the legs 110. The table 100 can be made mobile in other ways as well, such as by being disposed on a palette jack. Mobility allows the table 100 to be easily moved into or out of a packing line as needed. The top surface 105 of the table 100 is generally flat and level and disposed at a height that is convenient for users to manipulate clamshells or other nested packaging products.

The top surface 105 is bounded by two sets of opposing sides, one set including a front side 120 and a back side 125, the other including a left side 130 and a right side 135. The table 100 also comprises a lateral rail 140 and a transverse rail 145. The lateral rail 140 can be disposed on the top surface 105 proximate to, and extending generally parallel to, the front side 120. A person using the table 100 to associate traceability codes on clamshells with unique identifiers on containers stands at the front side 120 of the table 100 and hold stacks of clamshells against the lateral rail 140 as described with respect to FIG. 2. The lateral rail 140 can be flush with the front side 120, as illustrated, or set back a small distance from the front side 120, in some embodiments.

The lateral rail 140, in some embodiments, includes one or more calibration markings 150 to indicate one or more lengths measured from the transverse rail 145, where each length is calibrated to a stack of a known number of clamshells, for example, sixty clamshells. Thus, a stack of the number of clamshells, when held against the transverse rail 145, will extend just to the calibration marking 150. The calibration marking 150 can be an inscribed line, notch, or other suitable marking.

The transverse rail 145 can be disposed on the top surface 105 generally perpendicular to the lateral rail 140. In some embodiments, the lateral rail 140 and transverse rail 145 are joined together, as shown, while in other embodiments the rails 140, 145 terminate separately. The table 100 can be left-handed or right-handed, depending on whether the transverse rail 145 is disposed closer to the left side 130 or the right side 135, as particularly illustrated in FIG. 1.

The table 100 also comprises a means for reading a traceability code on a clamshell when the clamshell is held against a first side 160 of the transverse rail 145. An example of such means is a first scanner 155. The first scanner 155 is configured to read a traceability code on the clamshell by being oriented to scan in the direction of the traceability code from a position on the top surface 105 within range of the traceability code, when the clamshell is appropriately positioned. For example, the first scanner 155 can be disposed on the top surface 105 proximate to the transverse rail 145. The first scanner 155 can be adjustably attached to the top surface 105 such that the orientation of the first scanner 155 can be set to different clamshell designs and different traceability code locations thereon, for instance. In some embodiments, the first scanner 155 is disposed proximate to a second side 165 of the transverse rail 145, where the second side 165 opposes the first side 160.

The table 100 also comprises a means for reading a unique identifier disposed on a container disposed proximate to the top surface 105, such as a second scanner 170. In the illustrated embodiment, the second scanner 170 is disposed on the top surface 105 proximate to the right side 135 of the table 100 and aimed towards a location where containers can be placed proximate to the top surface 105. The second scanner 170 can be adjustably attached to the top surface 105 such that the orientation of the second scanner 170 can be set to different container dimensions and different unique identifier locations thereon, for instance.

The table 100 can also comprise a computing system including processing means 175, a display 180, and an input device (not shown) like a keyboard and/or a mouse, in some embodiments. The processing means 175 is in communication with the first and second scanners 155, 170 and optionally in communication with a host (not shown) over a wireless communication link, for example. The processing means 175 can be, in some embodiments, a personal computer (PC). The processing means 175 includes logic configured to associate a unique identifier read by the second scanner 170 with one or more traceability codes read by the first scanner 155, and logic configured to store such associations, for instance, in a database. In FIG. 1 the processing means 175 is shown disposed on the top surface 105, but it will be appreciated that the processing means 175 can be placed in other locations on the table 100 such as on a shelf (not shown) disposed beneath the top surface 105.

Figure 2:
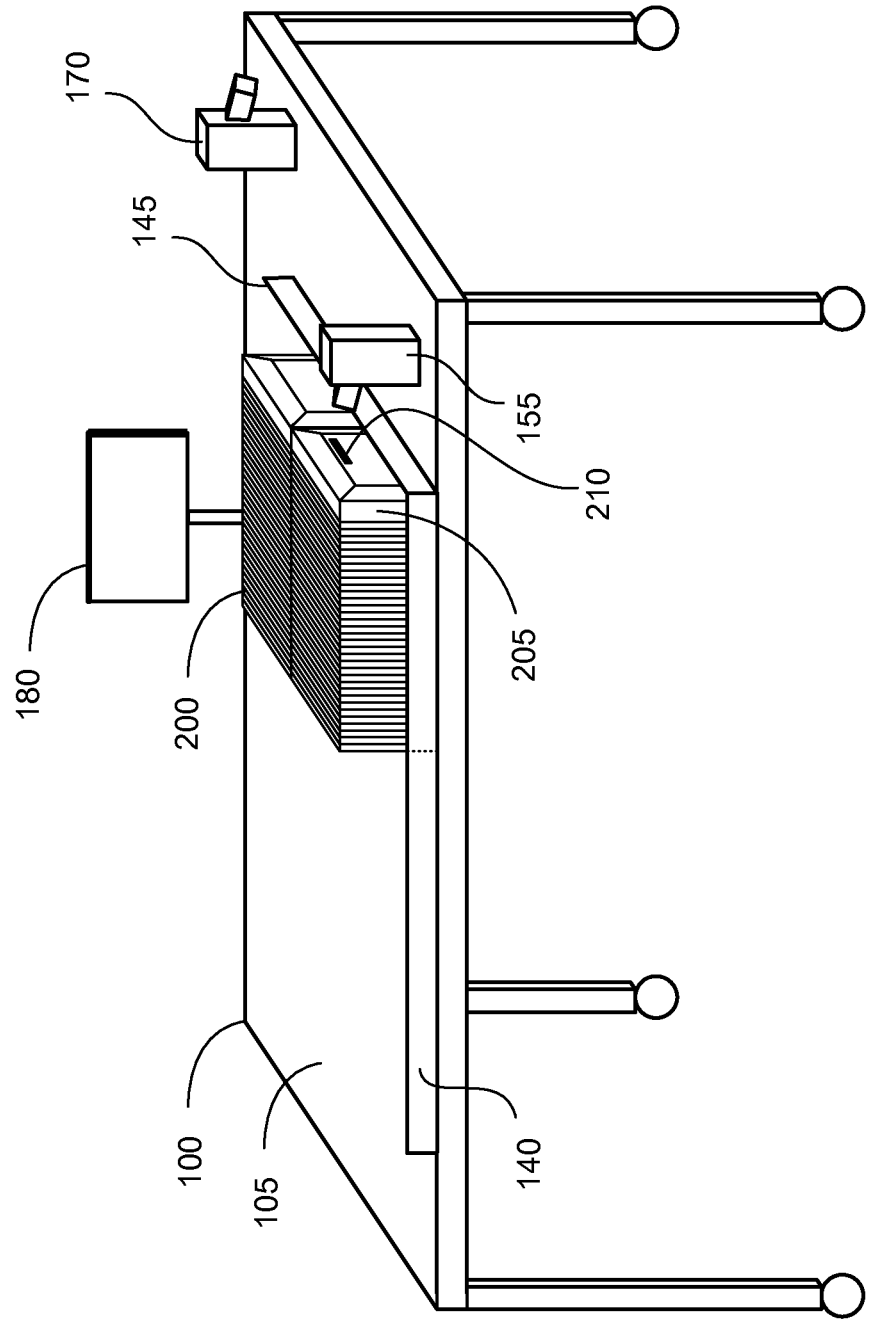
FIG. 2 shows a perspective view of the table of FIG. 1 with a stack of clamshells positioned against lateral and transverse rails thereof, according to an exemplary embodiment of the invention.

FIG. 2 shows a perspective view of the table 100 of FIG. 1 with a stack 200 of clamshells positioned against the lateral rail 140 and the transverse rail 145. By having the stack 200 positioned against both the lateral rail 140 and the transverse rail 145, in some embodiments, a top clamshell 205 of the stack 200 is appropriately positioned so that a traceability code 210 disposed on the top clamshell 205 is positioned where traceability code 210 can be read by the first scanner 155. It will be appreciated that the rails 140, 145 are conveniently employed to appropriately position the stack 200 relative to the first scanner 155, but that lines drawn on the top surface 105, for instance, can serve the same purpose.

Figure 3:
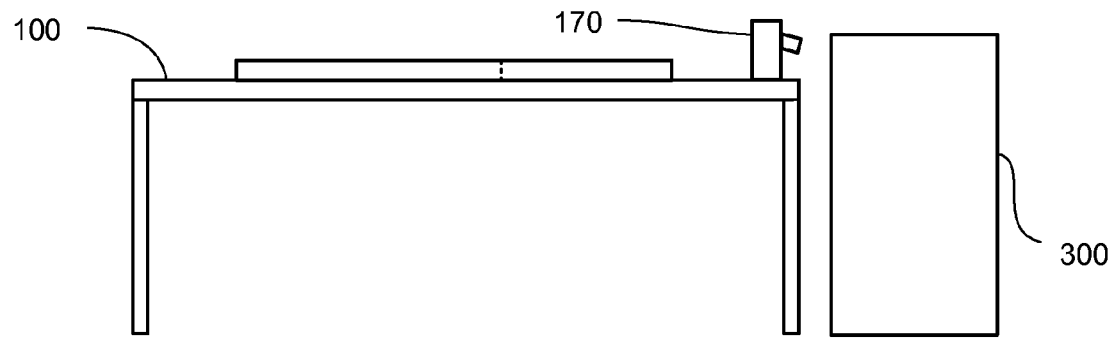
FIGS. 3-5 show alternatives for positioning a container proximate to the top surface of the table of FIG. 1, according to three exemplary embodiments of the invention.
Figure 4:
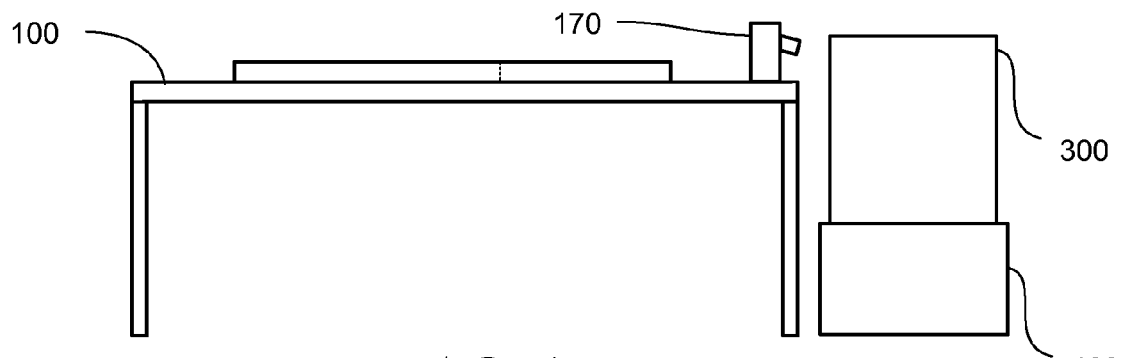
Figure 5:
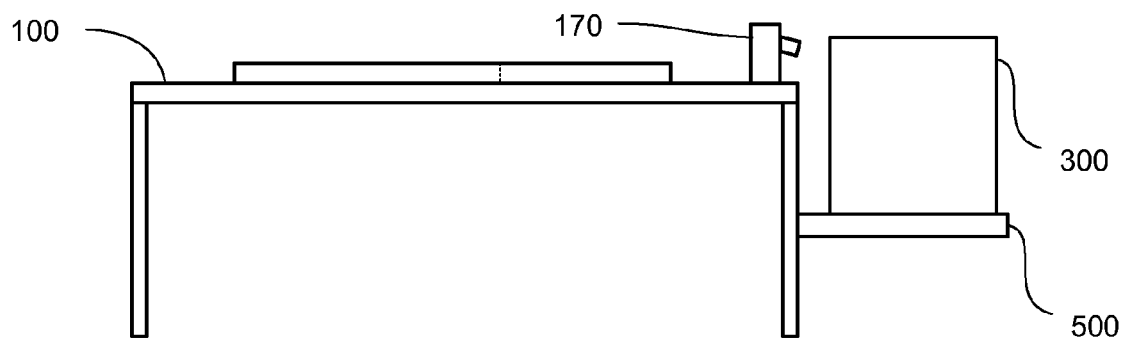

FIGS. 3-5 show front views of several alternatives for positioning a container 300 proximate to the top surface 105 of the table 100 of FIG. 1. In each of these drawings the first scanner 155 has been omitted for clarity. The container can be a case appropriately sized for holding a specific number of stacks 200 of clamshells, for example. In FIG. 3, the container 300 rests on the floor proximate to the table 100. The floor may include alignment markings, for example, to aid in the correct positioning of the container 300 so that a unique identifier disposed on the container 300 is situated such that the unique identifier can be read by the second scanner 170. In FIG. 4, the container 300 rests on a pedestal 400 disposed on the floor. In FIG. 5, the container 300 rests on an extension 500 of the table 100. Each of the alternatives shown in FIGS. 3-5 serve to position the container 300 where a unique identifier on the container 300 can be reliably read by the second scanner 170. While in the illustrated embodiments the second scanner 170 is disposed on the top surface 105 of the table 100, and therefore the container needs to be positioned proximate to the top surface 105 so the unique identifier on the container 300 can be read, in other embodiments the second scanner 170 can be positioned elsewhere, such as on a shelf (not shown) beneath the top surface 105, attached to a leg 110 of the table 100, or not even on the table 100 such as on the floor proximate to the table 100. In such other embodiments, the container 300 is positioned proximate to such second scanner 170.

Figure 6:
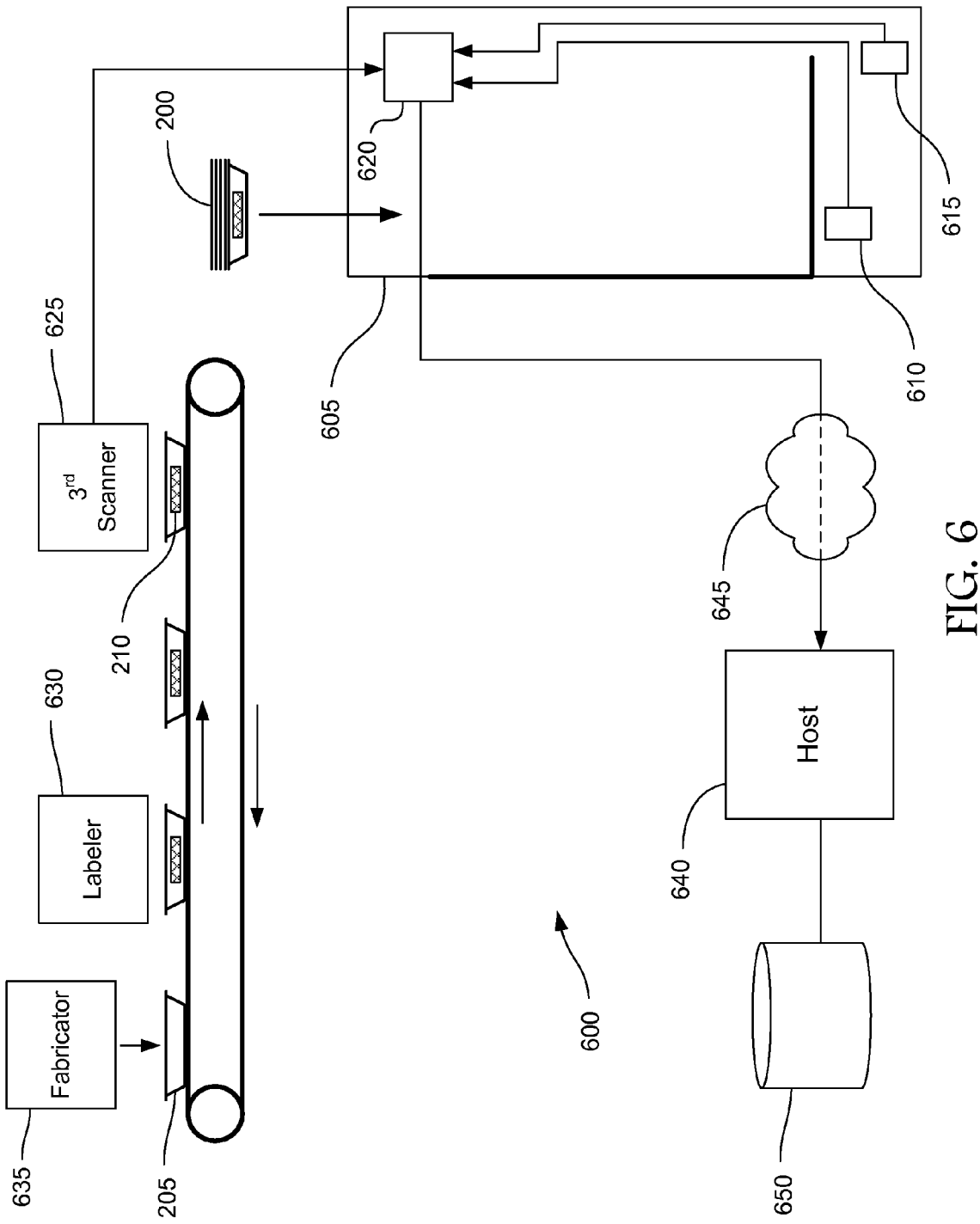
FIG. 6 shows a schematic representation of a system including a table with two scanners, a third scanner disposed off of the table, and a host computing system, according to an exemplary embodiment of the invention.

FIG. 6 shows a schematic representation of an exemplary system 600 including a table 605, such as table 100 (FIG. 1), having a first scanner 610 and a second scanner 615 such as scanners 155 and 170 (FIG. 1). The first scanner 610 is configured to read a traceability code 210 on a clamshell 205 of a stack 200 of clamshells, and the second scanner 615 is configured to read a unique identifier on a container (not shown) when disposed proximate to the table 605. The table 605 further comprises logic 620, such as processing means 175, in communication with the first and second scanners 610, 615 and configured to receive data therefrom.

The system 600 also comprises a third scanner 625 configured to read the traceability codes 210 from individual clamshells 205. As shown in FIG. 6, the third scanner 625 is not disposed on the table 605 but is in communication with the logic 620 of the table 605. In operation, the traceability code 210 of each clamshell 205 is read by the third scanner 625 before the clamshells 205 are nested to form the stack 200 and placed on the table 605. The third scanner 625 communicates read traceability codes 210 to the logic 620. After the traceability codes 210 have been read from the clamshells 205, the clamshells can be nested manually or mechanically. In some embodiments, the system 600 further comprises clamshell nesting equipment to nest the labeled clamshells 205 into stacks 200.

In some embodiments, the system 600 also comprises a labeler 630. In these embodiments unlabeled clamshells 205 are labeled by the labeler 630 before the third scanner 625 reads the traceability codes 210 from those clamshells 205. In the alternative, labels can be applied by hand to unlabelled clamshells 205 instead of by a labeler 630. In still other embodiments, the as-received clamshells 205 are both labeled and nested, and are subsequently de-nested and read by the third scanner 625 before being nested to form the stack 200.

Figure 7:
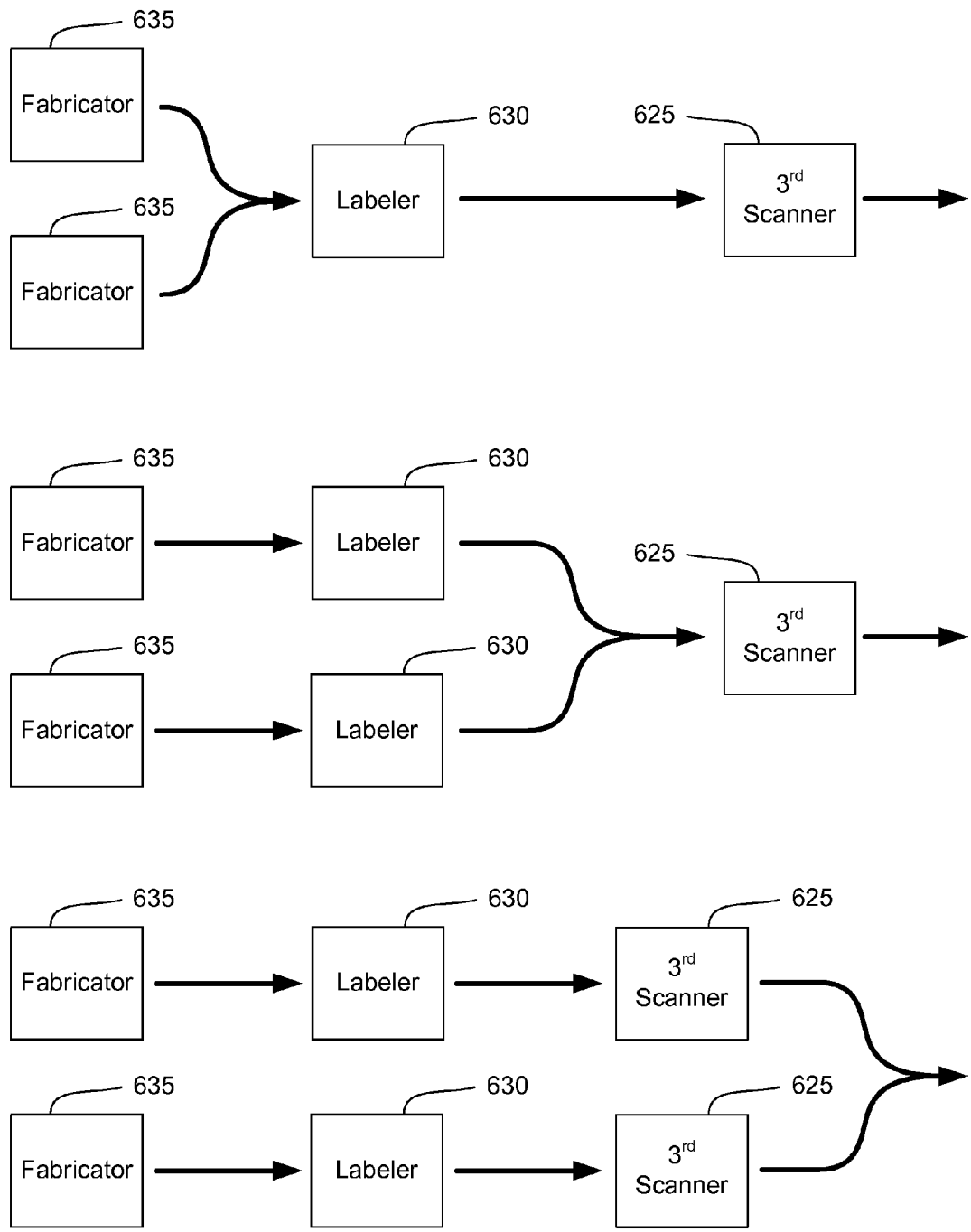
FIG. 7 shows schematic representations of production line configurations that include one or more of the third scanners, according to three embodiments of the present invention.

In various embodiments the system 600 further comprises a fabricator 635, such as a thermoformer, that fabricates clamshells 205. In some of these embodiments the fabricator 635, labeler 630, and third scanner 625 are arranged in the series shown in FIG. 6. Still further embodiments comprise multiple fabricators 635 arranged in parallel, as illustrated in FIG. 7, additionally discussed below. In some of the multiple fabricator 635 embodiments a separate labeler 630 follows each fabricator 635, the streams of labeled clamshells 205 are then comingled into a single merged stream, and the clamshells 205 in the merged stream pass by the third scanner 625 before being nested to form the stack 200. In still other embodiments the clamshells 205 from the several fabricators 635 are merged into a merged stream before being labeled and read.

The system 600 can further comprise a host computing system 640, in some embodiments. The host computing system 640 is configured to be able to communicate with the logic 620 of the table 605 across a network 645, such as the Internet. In these embodiments the logic 620 is also configured to be able to communicate with the host computing system 640 across the network 645.

It will be appreciated that the logic 620 and the host computing system 640 do not have to be in continuous communication, but can communicate intermittently, such as when needed. Accordingly, in some embodiments the logic 620 is configured to store to a memory device (not shown) data received from the first and second scanners 610, 615, and optionally from the third scanner 625, when present. In various embodiments the memory device can comprise a volatile memory such as random access memory (RAM) or non-volatile memory, such as a hard disk drive. In embodiments in which the logic 620 stores data received from the scanners 610, 615, and 625, the logic 620 may be further configured to store a timestamp in association with each traceability code 210 read by the first scanner 610 and the third scanner 625 and each unique identifier read by the second scanner 615. The logic 620 in these embodiments can be further configured to upload the associated pairs of traceability codes 210 and timestamps, and unique identifiers and timestamps, to the host computing system 640 when the two are in communication. In the alternative, traceability codes 210 read by the third scanner 625 can be stored according to the order in which they were read, without reference to timestamps.

In some embodiments, the logic 620 is configured to associate traceability codes 210 read by the third scanner 625 with the unique identifiers read by the second scanner 615. In other embodiments, the host computing system 640 includes such association logic. One way in which to make this association is to associate a traceability code 210 read by the first scanner 610 with a unique identifier read by the second scanner 615, and then associate with that unique identifier a number of clamshells 205 read by the third scanner 625, such as a number of traceability codes 210 read by the third scanner 625 either immediately before or immediately following the particular traceability code 210 that was read by the first scanner 610. All of the associations between traceability codes 210 and unique identifiers can be stored in a database 650 in communication with the host computing system 640. The database can be queried by traceability code.

For example, if stacks 200 comprises 100 clamshells 205 each, and clamshells 205 are added to the stacks 200 in the order in which they were labeled and read, then the traceability code 210 of the clamshell 205 on the bottom of a stack 200 will have been read by the third scanner 625 first, followed by the 99 other traceability codes 210 in the stack 200. If the traceability code 210 of the top clamshell 205 on the stack 200 is later read by the first scanner 610, then the 99 traceability codes 210 read by the third scanner 625 that precede the particular traceability code 210 subsequently read by the first scanner 610 can be further associated with the unique identifier read by the second scanner 615.

All of the associations between traceability codes 210 and unique identifiers can be stored by the host computing system 640 in a database 650 in communication therewith. The database 650 can be queried by traceability code 210 to find a unique identifier of a container 300 in which the clamshell 205 bearing that traceability code 210 was nested. In addition, all of the clamshells 205 in the same stack 200, and in the same container 300, as the target clamshell 205 can be identified. Further, harvest event data for one or more harvest events may be further associated with the unique identifier and therefore can be found by knowing a particular traceability code 210.

FIG. 7 is a schematic representation of three exemplary alternative production line configurations that include multiple fabricators 635 and one or more of the third scanner 625. Multiple fabricators 635 may be desirable where the fabricators 635 employ thermoforming because the step of thermoforming the clamshells 205 can be slower than the steps of labeling and reading the traceability codes from the labels.

In the top example in FIG. 7, the clamshells 205 that are produced by a plurality of fabricators 635 are merged into a single stream for labeling and scanning. In the middle example, the clamshells 205 that are produced by each of the plurality of fabricators 635 are labeled by labelers 630 that are dedicated to those fabricators 635, and the streams of labeled clamshells 205 are merged before the traceability codes 210 are read by the third scanner 625. In the bottom example, the clamshells 205 produced by each of the plurality of fabricators 635 are labeled and read by labelers 630 and third scanners 625, respectively, that are dedicated to those fabricators 635, and the streams of labeled clamshells 205 are merged after the traceability codes 210 are read by the respective third scanners 625 and before the clamshells 205 are nested to form stacks 200.

Figure 8:
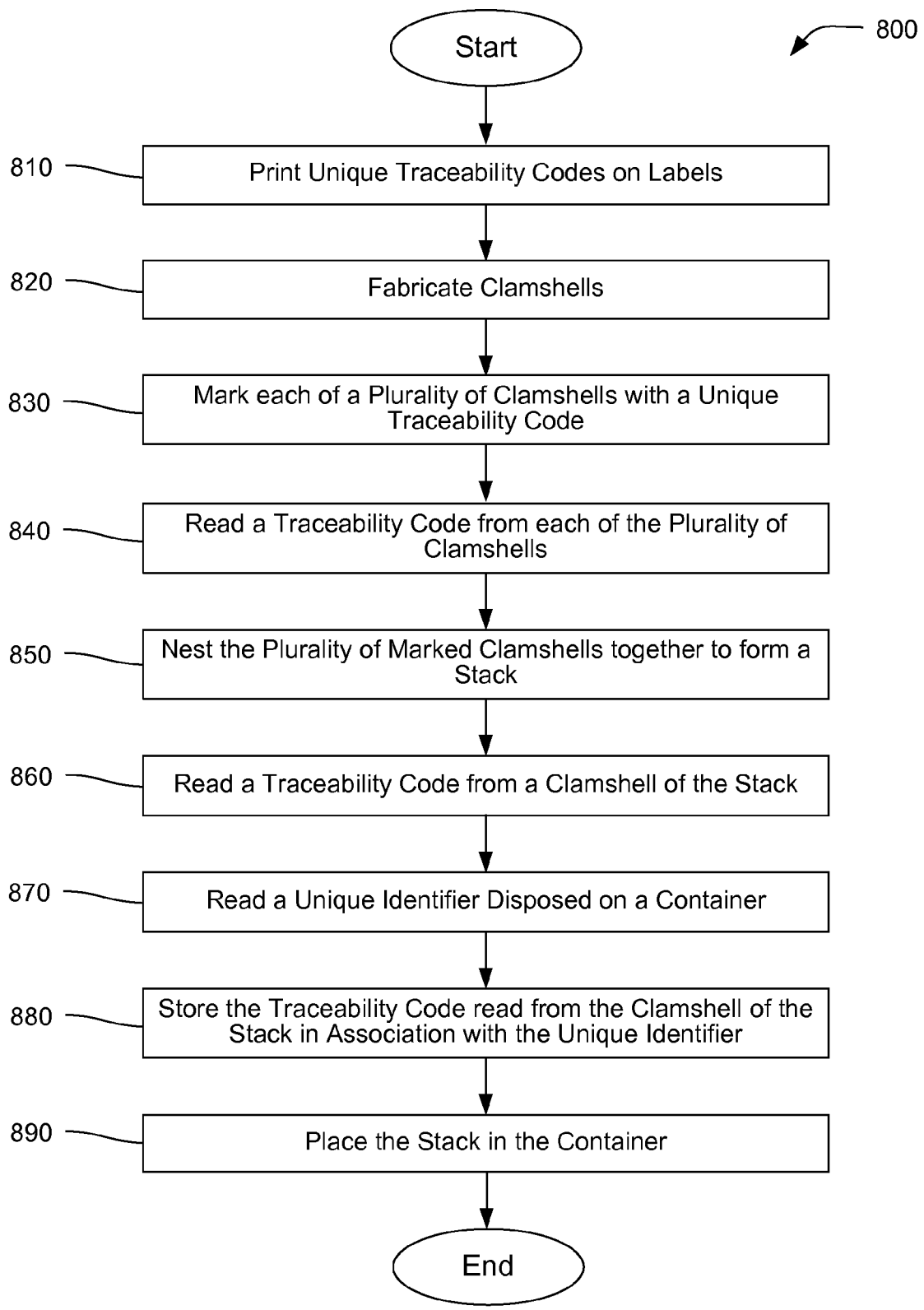
FIG. 8 is a flowchart representation of an exemplary method for associating traceability codes on clamshells with unique identifiers on containers.

FIG. 8 is a flowchart representation of an exemplary method 800 for associating traceability codes 210 on clamshells 205 with unique identifiers on containers 300. As noted above, although method 800 is described with specific reference to clamshells 205, methods of the invention can be applied to other unit-level packaging that can be nested when empty.

The method 800 optionally begins with a step 810 of printing the traceability codes 210 on labels. The labels can be disposed in sheets or on rolls, for example. It will be appreciated that each generated traceability code 210 is unique. Exemplary methods for generating and printing traceability codes 210 are described, for example, in U.S. patent application Ser. No. 11/743,648 filed on Sep. 6, 2007 and titled "System and Method of Product Information Coding and Authentication" which is a Continuation-in-Part of U.S. patent application Ser. No. 11/347,424 filed on Feb. 2, 2006 and titled "Method and System for Deterring Product Counterfeiting, Diversion and Piracy," which claims priority from U.S. Provisional Patent Application No. 60/650,364 filed on Feb. 3, 2005 and titled "System, Method and Technique for Combating Product Counterfeiting, Piracy and Diversion," each of which is incorporated herein by reference.

In some embodiments, the step 810 of printing the traceability codes 210 on labels includes generating the traceability codes 210 with a host computing system 640 and transmitting the traceability codes 210 from the host computing system 640 over a network connection to a secure printing device, for instance, to labeler 630. Communication between the labeler 630 and the host computing system 640 can optionally run through the logic 620. In other embodiments the labels are printed at a site remote from the labeler 630 and then transferred to the site of the labeler 630.

It will be appreciated that step 810 is optional in that some methods of the invention can be practiced by an entity using pre-printed labels supplied by another entity. Step 810 is also optional because in some embodiments labels are not used and instead the traceability codes 210 are printed directly onto the clamshells.

The method 800 optionally also comprises a step 820 of fabricating clamshells 205. Fabricating clamshells 205 can comprise, for example, thermoforming the clamshells 205. In some alternative embodiments, rather than the step 820 of fabricating the clamshells 205, the clamshells 205 are received from a manufacturer. Here, the as-received clamshells 205 are unlabeled and nested in stacks 200. In these embodiments the method 800 further comprises singulating the as-received clamshells 205 from the nested stacks 200.

The method 800 optionally also comprises a step 830 of marking each of a plurality of clamshells 205 with a traceability code. In some embodiments, such as those embodiments that include step 810 of printing the traceability codes on labels, step 830 includes affixing a label to each of the plurality of clamshells 205. Affixing the labels to the plurality of clamshells 205 can be performed either manually or mechanically, such as with a labeler 630. In other embodiments, each traceability code can be printed or otherwise inscribed directly onto the clamshell 205. Regardless of the method of marking the clamshells 205, each traceability code 210 should be marked in approximately the same location on each clamshell 205.

The method 800 optionally also comprises a step 840 of reading a traceability code 210 from each of the plurality of clamshells 205. This step can be performed, for instance, with the third scanner 625 as labeled clamshells 205 are transported past the third scanner 625. Step 840 can further comprise transmitting the traceability code 210 from the third scanner 625 to logic 620 of the table 605.

Some embodiments of the method 700 that include the step 830 of marking each of the plurality of clamshells 205 also comprise a step 850 of nesting the plurality of marked clamshells together to form a stack 200. In those embodiments of the method 800 that additionally include the optional step 840 of reading a traceability code 210 from each of the plurality of clamshells 205, the step 850 is performed after the step 840.

The method 800 comprises a step 860 of reading a traceability code 210 from a clamshell of the stack 200, and a step 870 of reading a unique identifier disposed on a container 300. Reading the traceability code 210 from the clamshell of the stack 200 can comprise, for example, scanning the traceability code 210 from the clamshell, or from a label affixed thereto, with the first scanner 155. Likewise, reading the unique identifier disposed on the container 300 can comprise, for example, scanning the unique identifier with the second scanner 170. The unique identifier can be printed or otherwise inscribed on the container 300, or provided on a label.

The steps 860, 870 can occur in either order or generally at the same time. It will be appreciated that although FIG. 2 shows the traceability code 210 on the top clamshell 205, a traceability code 210 can just as readily be placed on a bottom clamshell 205 of the stack 200. Accordingly, in various embodiments, step 860 can comprise reading the traceability code 210 from the top or bottom clamshells 205 of the stack 200.

In some embodiments, in step 870, a container 300 is placed proximate to the top surface of the table 100 and a user of the table 100 provides an input to the processing means 175 of the computing system to read the unique identifier, whereupon the processing means 175 controls the second scanner 170 to read and communicate the unique identifier to the processing means 175. In other embodiments simply bringing the unique identifier within range of the second scanner 170 will cause the second scanner 170 to read the unique identifier.

In some embodiments, in step 860, a stack 200 of clamshells 205 in positioned against the lateral rail 140 and the transverse rail 145 such that a top clamshell 205 of the stack 200 faces the first scanner 155. Optionally, in step 860, a user of the table 100 can verify the number of clamshells 205 in the stack 200 by reference to the calibration marking 150. In some embodiments, once the unique identifier on the container 300 has been read in step 870, whenever a stack 200 of clamshells 205 is properly positioned on the table 100, the first scanner 155 reads the traceability code 210 from the top clamshell 205 of the stack 200. In other embodiments, traceability codes 210 are read when a user of the table 100 provides an input to the processing means 175. It will be appreciated that while reading the traceability codes 210 and unique identifiers in steps 860, 870 can be performed with one or more hand-held scanners without employing the table 100, one advantage of the table 100 is that hands are freed by not having to hold a hand-held scanner, thus making the method 800 more time efficient.

In a step 880, the method 800 continues by storing the traceability code 210 read from the top clamshell 205 of the stack 200 in association with the unique identifier read from the container 300. Step 880 can also include storing traceability codes 210 read from each clamshell 205 by the third scanner in association with the unique identifier read from the container 300. In some instances, step 880 further comprises uploading the traceability codes 210 read by the first and third scanners 610, 625 and the unique identifiers read by the second scanner 615 to a host computing system 640. Step 880 can further comprise making the associations that are stored, and the associations can optionally be made by the logic 620 of the table 605, or by the host computing system 640.

After a stack 200 has been read in step 860, the stack 200 can be placed in the container 300 in a step 890. In some embodiments, either the processing means 175 or the host computing system 640 includes association logic, such as programming instructions, configured to associate a unique identifier with the one or more traceability codes 210 read by the first scanner 610 after the unique identifier was read. The association logic, in further embodiments, can be configured to also associate traceability codes 210 read by the third scanner 625 with the unique identifier. In some embodiments, the processing means 175 provides a visual display on the display 180 to show how many stacks 200 of clamshells have been associated with the container 300 and how many further stacks 200 need to be scanned to completely fill the container 300.

By having the association between containers 300 and the stacks 200 of clamshells therein, a container 300 of labeled clamshells can be scanned in a produce field, for example, and all of the traceability codes of the labeled clamshells in the container 300 can then be further associated with harvest event data such the location of the field, the date, and so forth. Accordingly, in some embodiments method 800 further comprises the optional steps of reading a unique identifier from a container 300, and associating harvest event data with that unique identifier.

Computing systems, computing means, and logic described herein can be configured to perform method step described herein, for example, through the use of hardware, such as application-specific integrated circuits (ASICs), specifically designed to perform the particular functions of the method. Computing systems, computing means, and logic described herein can also be configured to perform method step described herein, for example, through the use of firmware residing, for instance, in read only memory (ROM) or flash memory, where the firmware is programmed to perform the particular functions of the method. Computing systems, computing means, and logic described herein can further be configured to perform method step described herein, for example, through the use of a processor capable of executing software residing in a memory, for example, in random access memory (RAM), where the computer instructions embodied in the software perform steps of the methods of the invention. Computing systems, computing means, and logic described herein can also comprise any combination of two or more of hardware, firmware, and software.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A system for associating clamshells with containers comprising:
   a table including
      a transverse rail disposed on a top surface,
      a first scanner configured to read a traceability code on a clamshell of a stack of clamshells held against the transverse rail,
      a second scanner configured to read a unique identifier disposed on a container disposed proximate to the top surface, and
      a computing system in communication with the first and second scanners; and
   a third scanner in communication with the computing system.

2. The system of claim 1 further comprising a labeler configured to affix labels to clamshells, wherein the third scanner is configured to read traceability codes from the labels affixed to the clamshells by the labeler.

3. The system of claim 1 further comprising a clamshell fabricator.

4. The system of claim 1 further comprising a host computing system, wherein the computing system of the table is configured to upload traceability codes and unique identifiers read by the first and second scanners to the host computing system.

5. The system of claim 4 wherein the host computing system includes association logic configured to associate traceability codes with unique identifiers and to store the associations.

6. The system of claim 1 wherein the third scanner is not disposed on the table.

* * * * *